March 2, 1948.  R. W. HUNTER  2,436,892
METHOD AND APPARATUS FOR ALIGNING MACHINERY
Filed Jan. 25, 1944
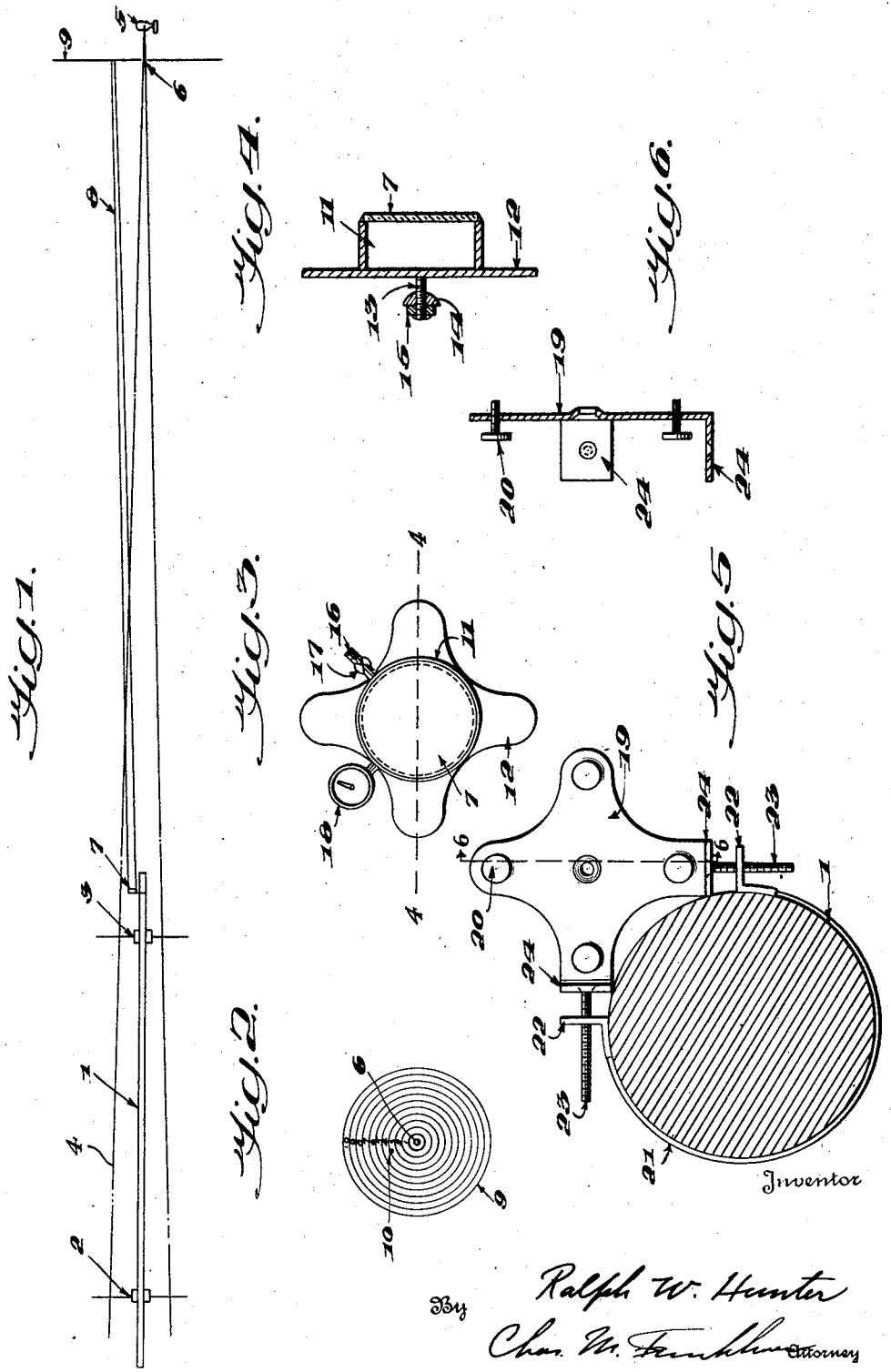
Inventor
Ralph W. Hunter
By Chas. M. Franklin Attorney Patented Mar. 2, 1948

2,436,892

UNITED STATES PATENT OFFICE 2,436,892

METHOD AND APPARATUS FOR ALIGNING MACHINERY

Ralph W. Hunter, Jacksonville, Fla.

Application January 25, 1944, Serial No. 519,667

5 Claims. (Cl. 88—14)

This invention relates to a method of and apparatus for the alignment of rotary machine parts such as long sectional shafting either in final installation or for the alignment of boring apparatus for the preparation of the shaft bearings for final installation or for the establishment of proof marks from a pilot shaft to which the shafting or boring apparatus may be set.

One illustrative example of the invention is in the alignment of a boring bar used in boring the stern frame to receive a stern tube and tail shaft in steel ship construction. In this application of the invention it is desired to place in axial alignment with a predetermined distant point (the axis of the engine) a rotary shaft having two bearings, the axial center of the shaft at its after bearing at the ship stern being predetermined and this bearing being fixed to hold the shaft in its proper location at that point.

An important object of the present invention is to provide a novel method of and apparatus for establishing plane surfaces in a definite relation to a distant predetermined point such as shapers, milling machines, boring apparatus and the like set in groups to perform simultaneous operations on large castings and the like.

Another object of the present invention is to provide a novel form of light beam projection apparatus whereby a beam of light shall be employed to enable the bearing members to be formed or positioned in accurate axial alignment.

Another object of the invention is to provide apparatus of the character designated in which the several parts shall be readily adjustable to include a wide range of working conditions.

A further object of the invention is to provide apparatus of the character designated which shall be simple in construction and increase the speed and accuracy in forming and aligning machinery parts.

These and other objects of the invention will be more apparent from the following specification and drawing and particularly set forth in the claims.

In the drawings:

Fig. 1 is a diagrammatic view illustrating a rotary shaft and the optical apparatus for aligning the same with a distant point;

Fig. 2 is a front view in elevation of an indicator target;

Fig. 3 is a front view of a light beam reflector;

Fig. 4 is an enlarged sectional view on line 4—4 of the reflector shown in Fig. 3;

Fig. 5 is a rear view partially in section showing a bracket for attaching a reflector to a shaft; and Fig. 6 is a sectional view on line 6—6 of Fig. 5.

Referring to Figs. 1 and 2 of the drawings there is shown diagrammatically an illustrative embodiment of the invention wherein a shaft indicated by the numeral 1 is supported by bearings 2 and 3. The bearing 2 is preferably in fixed location and the bearing 3 is adjustable to bring the shaft to its desired position so as to align the shaft with another distant fixed point 6, which, in the illustrative example, may be the axis of the ship's engine shaft.

In the operation of the device the distant reference point 6 with which the shaft, or other machinery part may be aligned, is preferably a small aperture in the exact center of a fixed circular target 9 as shown in Fig. 2.

A beam of light 4 from a source 5 is projected through the aperture (the fixed distant point) and directed so that it will cover through a complete revolution of the shaft, a concave reflector 7 firmly attached to the forward end of shaft 1 as shown in Fig. 5. The reflected beam 8 falls on the target 9 producing a visible image 10 and this image will trace a circle on the target as the shaft 1 carrying the reflector is slowly rotated.

On the face of the target 9 are drawn numbered circles concentric with the true center 6. The circles are fixed at such intervals that they shall provide a scale denoting, in thousandths of an inch, the adjustment necessary to cause the image to trace a circular path which shall coincide with the circles.

It will be noted from basic geometric law that the center of the circle described by the image 10 on the target 9 is the axial center of the shaft 1, projected to that point. Therefore, if the path of the image 10 coincides with the circles on the target 9, the shaft is in axial alignment with the point 6. Of course it is understood that the bearing 2 being fixed and the bearing 3 being adjustable the shaft is adjusted to cause the reflector to move and produce the image 10 on the target. In other words, should the circle described by the image be eccentric with the circles on the target the bearing 3 supporting the forward end of the shaft, is adjusted in accordance with the scale on the target or until precise alignment is attained by observing the annular movement of the image 10 with reference to the concentric circles on the target 9.

The angle of incidence being equal to the angle of reflection, any deviation of the shaft from true alignment will result in a two to one magnification of the error as shown by the path of the image. In other words the actual error is but one half the apparent error shown by the path of the image. This makes it possible to obtain precise results.

As a further application of the invention, if the shaft to be aligned has more than one bearing, a reflector may be attached to the shaft at or near each bearing (except at the fixed point) and the path of the image from each reflector is noted as hereinbefore described. Adjustment of bearings as a result of the image traced on the target must begin with the one adjacent to the fixed one, the farther ones being left free to move until each successive adjustment is completed. The specific adjustable bearing apparatus is well understood in the art and no further description is deemed necessary.

Due to the high cost of grinding and polishing reflectors of long focal length and the necessity of having a large assortment to fit all jobs, the reflector 7 is an optically true flat glass sealed over the end of a metal cylinder 11 from which the air is expelled with an ordinary suction pump through a connection 16 until the desired concavity and focal length is produced, thus making the reflector adjustable to all conditions encountered. The connection 16 is provided with a needle valve 17 so that the vacuum may be lowered if desired and a vacuum gauge 18 is provided to permit the reflector to be set to any desired focal length after the relation of vacuum to concavity has been determined.

The reflector 7 comprises a suitable base 12 which is fastened to the forward end of the shaft 1 by a bracket 19 having a stud bolt 13, a ball washer 14 and a nut 15 as shown in Fig. 4.

To provide for adjustment of the reflector base 12 relative to the bracket 19, there is provided four adjusting screws 20, to permit the reflected beams 8 to be directed on to the target 9. The bracket is secured to the shaft 1 by a flexible band 21, screw threaded lugs 22—22 attached to the ends of the band and screws 23 engaging suitable lugs 24—24 provided on the bracket 19.

Having thus described a preferred embodiment of my invention, it is obvious that some changes may be made therein without departing from the scope of the invention as set forth in the appended claims. For example, the shaft 1 may be a boring bar for drilling shaft bearings or it may be a pilot bar for aligning other associated machinery parts.

In the claims:

1. The method of axially aligning a shaft with a distant fixed reference point which comprises attaching a reflector at one end of the shaft, directing a beam of light from the reference point to the reflector, receiving the reflected image of said beam on a circular target having its center coincident with the reference point and having concentric indicator circles thereon, rotating the shaft with its reflector to cause the reflected image to move and trace a circle on said target, and adjusting the shaft axis relative to the reference point to cause the image to trace a circle concentric with the indicator circles.

2. Apparatus for aligning rotatable machinery parts, comprising a member mounted on one of the rotatable machinery parts to be aligned, a reflector mounted on said member at a point spaced from the axis of rotation of the said part, means for projecting a beam of light from a fixed reference point on the axis of the other machinery part to said reflector, the dimensions of said beam being such that the reflector receives light throughout its rotation about the axis of the first mentioned machinery part, a circular target indicator having its center at said reference point and its axis coincident with the axis of the light beam, said reflector being positioned to reflect light from said reference point onto said target indicator, and means for adjusting the axis of rotation of the first mentioned machinery part to cause the image produced by the reflector to move in a circle concentric with the axis of the target indicator.

3. The apparatus of claim 2, in which said adjusting means comprises an adjustable bearing support removably receiving the first mentioned machinery part, and the means mounting the reflector on the member comprises means for initially adjusting the reflector to direct the reflected beam of light onto said target indicator.

4. The apparatus of claim 2 in which the target is provided with a plurality of spaced apart indicator circles concentric with the axis thereof, and scale indicia associated with the circles for indicating the traverse of the beam of light image on the target circles.

5. The apparatus of claim 2 including fluid pressure means for adjusting the focal length of the reflector by varying the curvature thereof to bring the initial reflected image within the target area.

RALPH W. HUNTER.

REFERENCES CITED

The following references are of record in the file of this patent:

UNITED STATES PATENTS

| Number | Name | Date |
|---|---|---|
| 2,184,916 | Howle | Dec. 26, 1939 |
| 1,667,995 | Steinle | May 1, 1928 |
| 2,128,791 | Benford | Aug. 30, 1938 |